C. R. UEBELMESSER.
FILM ACTUATING MECHANISM FOR MOVING PICTURE MACHINES.
APPLICATION FILED OCT. 5, 1908.
996,952.
Patented July 4, 1911.
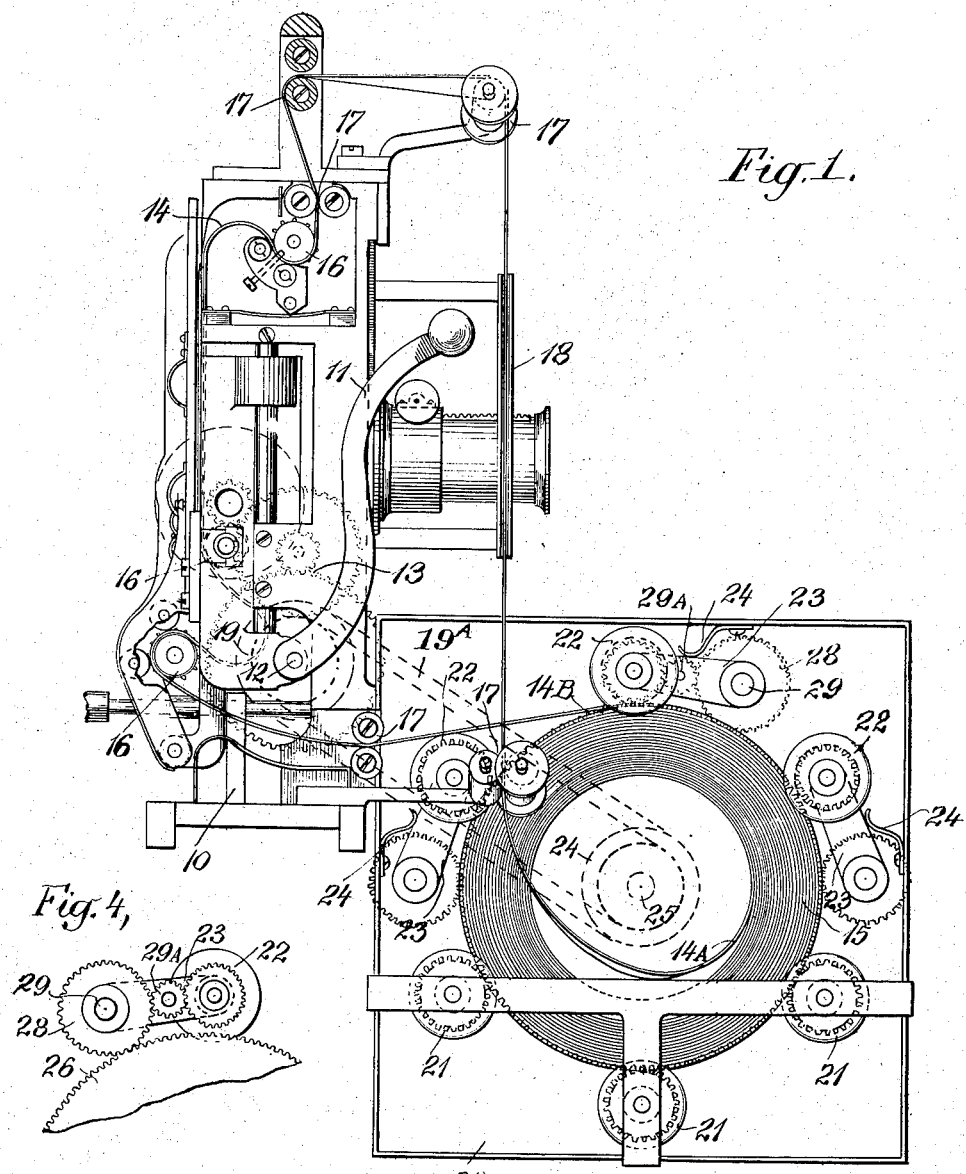

C. R. UEBELMESSER.
FILM ACTUATING MECHANISM FOR MOVING PICTURE MACHINES.
APPLICATION FILED OCT. 5, 1908.
996,952.
Patented July 4, 1911.
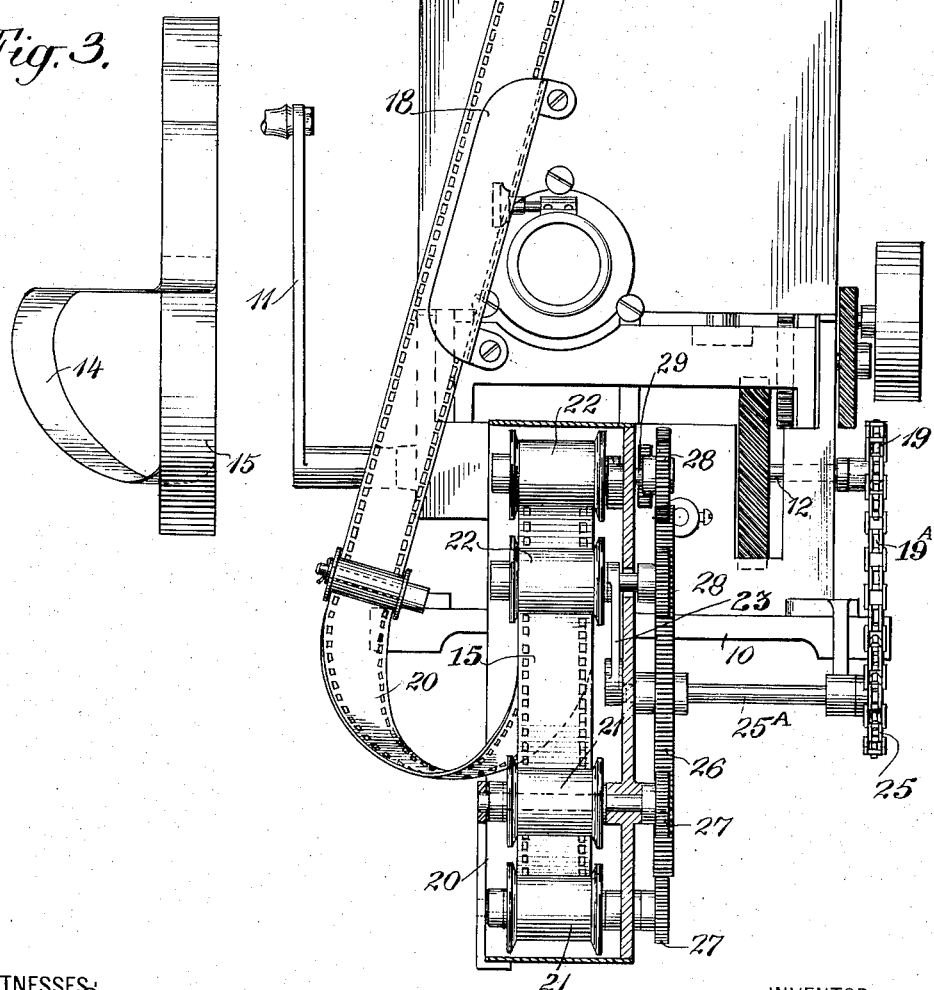

UNITED STATES PATENT OFFICE.

CHARLES R. UEBELMESSER, OF NEW YORK, N. Y., ASSIGNOR TO AMERICAN MOVING PICTURE MACHINE COMPANY, OF NEW YORK, N. Y., A CORPORATION OF NEW YORK.

FILM-ACTUATING MECHANISM FOR MOVING-PICTURE MACHINES.

996,952.  Specification of Letters Patent.  Patented July 4, 1911.

Application filed October 5, 1908. Serial No. 456,254.

*To all whom it may concern:*

Be it known that I, CHARLES R. UEBELMESSER, a subject of the Emperor of Germany, and a resident of the city of New York, in the county of New York and State of New York, United States of America, have invented certain new and useful Improvements in Film-Actuating Mechanism for Moving-Picture Machines, of which the following is a specification.

My invention relates to film actuating mechanisms for moving picture machines, and its object is to provide a simple driving device for such apparatus which shall actuate the film without putting undue strains thereon.

I will describe my invention in the following specification and point out the novel features thereof in the appended claims.

Referring to the drawings, Figure 1 shows in side elevation, partly in section, certain parts of a moving picture machine with my invention applied thereto. Fig. 2 is a front view of the apparatus with the film actuating mechanism shown more in detail. Fig. 3 is a diagrammatic representation of an endless film, showing the general path which it takes in passing through the various parts of the mechanism which I am about to describe. Fig. 4 is a detail of a part of my novel film actuating mechanism.

Like characters of reference designate corresponding parts in all of the figures.

10 designates a frame of a moving picture machine which may be of any of the well-known forms or designs of apparatus which is arranged to move a film upon which a series of pictures appear across a given line so that the pictures thereon be presented in rapid succession. As the machine forms no part of the present invention I will point out only such parts of it as are necessary to fully describe the invention. 11 is a crank for rotating the shaft 12 by means of which the apparatus may be driven, although, of course, the machine may be driven by a motor if desired. 13 designates gearing by means of which the film 14 is moved across the path of vision with an intermittent motion in the usual manner, and through which the other parts of the machine are actuated. The film is driven by a series of rolls with toothed flanges which are designated in the drawings by 16. 17 are guiding rolls for the film, and 18 is a guiding frame therefor. These parts are pointed out for the sake of showing the path which the film may take, but as their mechanical connections and the manner in which they operate may differ in different structures, these connections are not shown.

At 20 a receptacle for the film 14 is shown. The film is coiled up as shown at 15 and placed within this receptacle, resting upon a series of spools 21 which are pivotally supported upon fixed centers within the receptacle at a given distance away from a common center. Another series of similar spools 22 which are supported in the outer ends of pivoted arms 23 are pressed against the outer periphery of the film roll by springs 24. The arms which support these spools 22 are likewise spaced at equal distances from a common point at or near the common center above mentioned. In the drawings the film is shown as endless and a loop of it, beginning at 14$^A$, is led from the inside of the film roll 15 up over the guiding rolls 17, the frame 18 and the toothed driving spools 16 through the machine and back to the outside of the film roll at 14$^B$.

The spools 21 and 22 are constructed of some soft resilient material such as rubber and have cylindrical tractive surfaces where they come in contact with the film. They are also provided with flanges which pass over the sides of the film and serve the purpose of guiding the film and holding it in place.

A sprocket-wheel 19 is affixed to the driving shaft 12 and is connected by a sprocket-chain 19$^A$ with a similar sprocket-wheel 25 which is affixed to a shaft 25$^A$, which shaft projects from the central portion of the receptacle 20. A gear 26 is affixed to this shaft near the receptacle. Pinions 27 which are affixed to the ends of the arbors or shafts of the spools 21, are in mesh with this gear so that these spools are driven thereby. Similar pinions 28 are also in mesh with the gear 26 and are arranged to drive the spools 22. The spools 21 and the spools 22 are thereby driven at the same peripheral speed. Referring to Fig. 4 it may be seen that these pinions 28 are affixed to shafts 29 which form the pivots for the arms 23. A train of gearing 29$^A$ transmits the rotation of these shafts to the spools 22 so that these spools are driven in unison with the spools 21 and are still free to swing about the pivots 29. The mechanism for driving the spools is so proportioned and arranged that the peripheral speed of the spools 21 and 22 is equal to or slightly greater than the lineal speed of the film as it passes through the machine. It may be seen that the rate of rotation of the driving spools will increase and decrease proportionately to the rate at which the film is driven through the machine.

By means of the simple mechanism above described it may be seen that the film roll is held in suspension between a series of revoluble spools which are situated about a common point. The film may be freely unwound from the center of its coil by the usual mechanism of the machine, but is assisted in this part of the operation by the rotation of the film roll itself which is moved by the driving spools. These spools will not only hold the roll in position and rotate it as a whole, but will draw along that part of the film which is passed through the machine and wind it up on the outside of the film roll. The spools cannot tear or mutilate the film during the operation. The film roll or coil is not wound up upon a solid center so that it is not tightly wound upon itself, which might result in injuring its surface, but is rather held in suspension with its layers but slightly touching each other or entirely separated. The elasticity of the film will cause it to gradually push its convolutions forward so that its external diameter will remain practically constant. A number of driving spools are on fixed centers and the movable centers of the other spools will allow the apparatus to accommodate films of different lengths and compensate any changes which may occur in the outer diameter of the film roll during the operation. I sometimes drive only the fixed spools 21 and use the others merely as idlers for the purpose of guiding the film. The specific design of the parts herein shown and described as an illustration of my invention is arranged to actuate an endless film, but if desired, the same principle may be used for winding or coiling up films which are not endless.

What I claim is.—

1. In a film actuating mechanism, a plurality of spools, means for rotating the spools together, said spools being spaced about a common point and having tractive surfaces arranged to engage with the outer periphery of a roll of film, and to coil the film onto said roll.

2. In a film actuating mechanism, a plurality of spools mounted upon fixed spindles, a plurality of spools mounted upon pivoted arms, all of said spools being spaced about a common point, and means for rotating the spools together, said spools having tractive surfaces arranged to engage with the outer periphery of a roll of film, and to coil the film onto said roll.

3. In combination with a moving picture machine having a film driving mechanism, a plurality of spools spaced about a common point and arranged to tractively coil a film, and means for rotating said spools by the film driving mechanism.

4. In combination with a moving picture machine having a film driving mechanism, a plurality of spools mounted upon fixed spindles, a plurality of spools mounted upon pivoted arms, means for pressing said pivoted arms inward, all of said spools being spaced about a common point, and means actuated by the film driving mechanism for rotating said spools together.

In testimony whereof I have signed my name to this specification in the presence of two subscribing witnesses.

CHARLES R. UEBELMESSER.

Witnesses:
ELLA TUCH,
E. W. MARSHALL.